No. 735,168. PATENTED AUG. 4, 1903.
J. F. STEVENS.
ELECTRICAL MEASURING INSTRUMENT.
APPLICATION FILED NOV. 17, 1900.
NO MODEL. 2 SHEETS—SHEET 1.
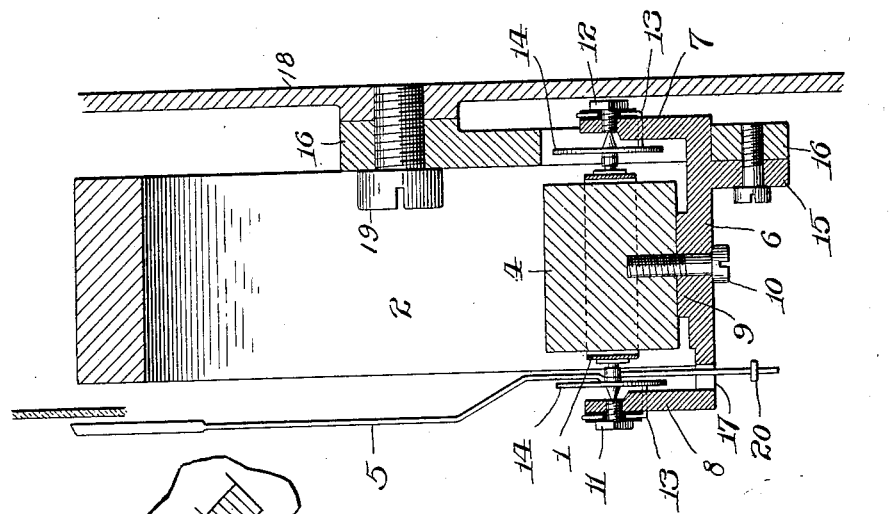
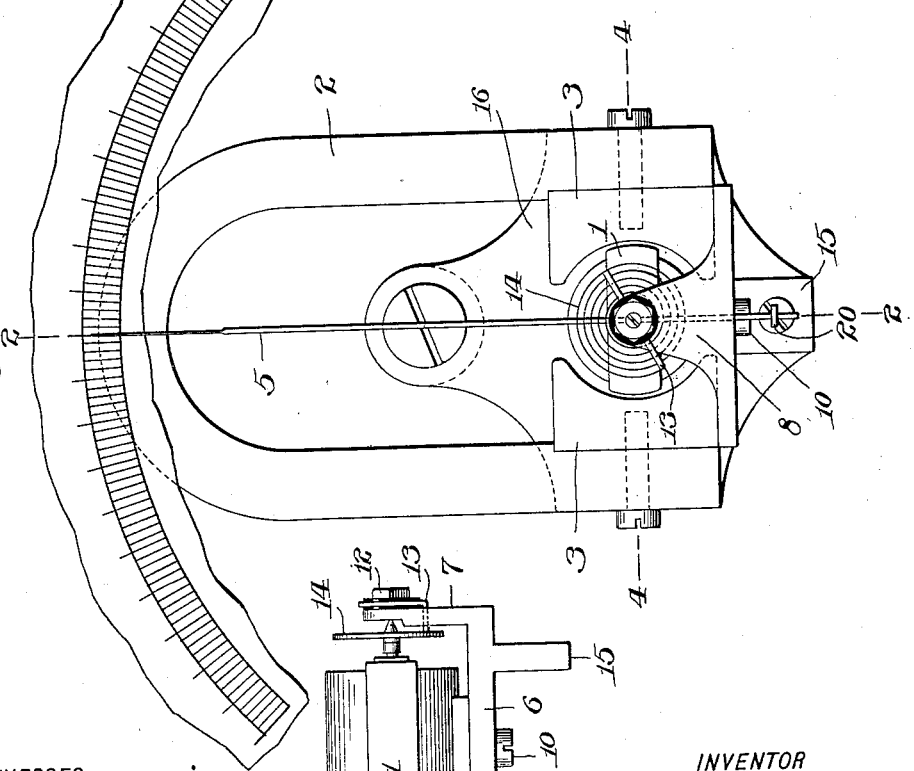
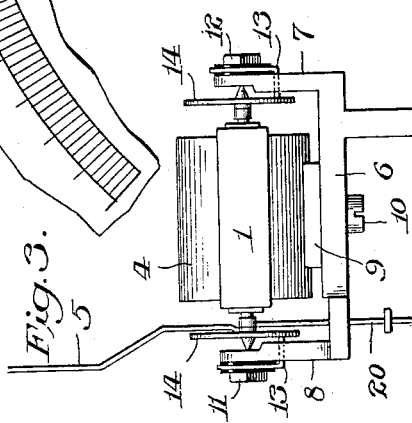
INVENTOR
John Franklin Stevens
BY
ATTORNEY
WITNESSES:

No. 735,168. PATENTED AUG. 4, 1903.
J. F. STEVENS.
ELECTRICAL MEASURING INSTRUMENT.
APPLICATION FILED NOV. 17, 1900.
NO MODEL. 2 SHEETS—SHEET 2.

WITNESSES:
Mae Hoffmann
JW Stokes Adam

INVENTOR
John Franklin Stevens
BY
ATTORNEY

No. 735,168. Patented August 4, 1903.

UNITED STATES PATENT OFFICE.

JOHN FRANKLIN STEVENS, OF PHILADELPHIA, PENNSYLVANIA.

ELECTRICAL MEASURING INSTRUMENT.

SPECIFICATION forming part of Letters Patent No. 735,168, dated August 4, 1903.

Application filed November 17, 1900. Serial No. 36,806. (No model.)

*To all whom it may concern:*

Be it known that I, JOHN FRANKLIN STEVENS, a citizen of the United States, residing at Philadelphia, in the county of Philadelphia and State of Pennsylvania, have invented a new and useful Electrical Measuring Instrument, of which the following is a specification.

My invention relates to improvements in electrical measuring instruments, especially to instruments designed to measure the potential or current in an electrical circuit conveying a direct or continuous current, and comprises the organization of an apparatus (known to the trade as a "voltmeter" and an "ammeter") whereby such instruments may be constructed and assembled with greater ease and less expense than by the method now practiced.

My invention also comprises improved means for conserving the initial accuracy, the efficiency of the instrument, and to render its indications aperiodic or dead-beat.

Figure 4:
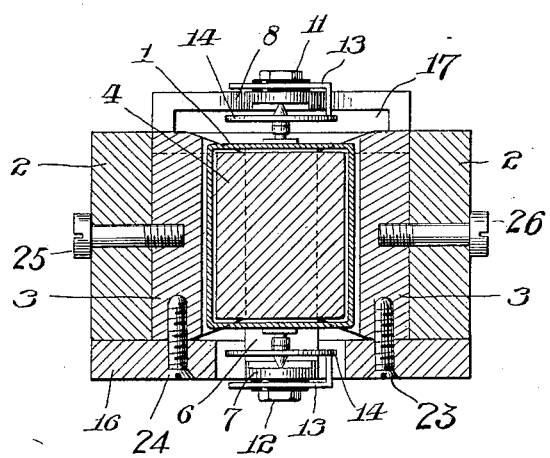
Figures 5, 6:
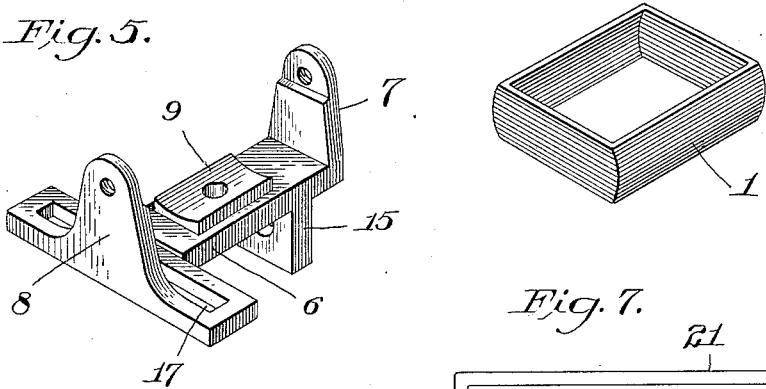
Figure 7:
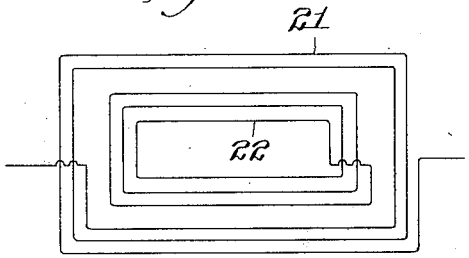

Referring to the accompanying drawings, Figure 1 is a plan view of my device without the case. Fig. 2 is a vertical section of same on line 2 2 of Fig. 1. Fig. 3 is a side elevation of the coil-supporting bracket and the assembled parts supported thereby. Fig. 4 is a vertical cross-section on the lines 4 4 of Fig. 1. Fig. 5 is a perspective view of the coil-supporting bracket. Fig. 6 is an isometric view of the movable coil. Fig. 7 is a diagrammatic view of same.

Similar numerals refer to similar parts throughout the several views.

The principle upon which my instrument depends for its operation is that of the well-known Deprez-D'Arsonval galvanometer—namely, a coil or helix of conducting-wire which oscillates between the poles of a permanent magnet. It is well known that if current from any source of electric power be conveyed into and out of a coil of wire when such coil is suspended between the poles of a permanent magnet the coil will tend to deflect until it reaches such a position that the lines of force generated in it due to the passage of the current will coincide in direction with the lines of force generated by the permanent magnet-field by which it is surrounded. The extent of movement of the moving coil is very closely proportional to the amount of current flowing in the coil. In early and primitive forms of this instrument it was customary to suspend the moving coil by means of conducting-filaments, which provided a conducting-path to lead the current into and out of the moving coil and in addition constituted a restraining force which tended to bring the coil back to its original or zero position when the current flow ceased. In somewhat later times the original construction was modified to the extent that the moving coil was suspended by means of pivots carried in jeweled bearings and the current was conducted into and out of the moving coil by means of flexible filaments which might of themselves constitute a restraining or controlling force or which might be used in connection with springs, which springs would constitute a restraining or controlling force. The extent of movement of the moving coil when such an instrument was properly calibrated by reference to a standard of voltage or current constituted a measure of the current flowing through the coil and in consequence enabled the user to read directly the actual electromotive force or current flow in the circuit under measurement. In order that the field of force generated by the permanent magnet should be uniform within the space traversed by the moving coil, thus giving a movement of the coil directly proportional to the increase or decrease of current flow in the moving coil, it has been customary to curve the pole-pieces to the arc of a circle and to provide a core circular in section, which core was located within the moving coil, but separated from it by an air-space, so that the moving coil moved or oscillated within the annular space within the pole-pieces and core, the core itself being constructed of some substance, such as iron, which is a good magnetic conductor. In all instruments on this principle which have been heretofore constructed the curved pole-pieces, (marked 3,) together with the core (marked 4) and the moving coil 1, together with the pointer 5, have been secured together, constituting an integral part of the instrument. It was therefore necessary in the construction of such instruments to assemble the parts referred to above and then attach to them the permanent magnet 2 by means of screws or pins. This form of construction made it necessary to remove the permanent magnet from the pole-pieces several times during the course of construction and calibration and also whenever it was necessary to take the instrument apart for purposes of repair or recalibration. This was a serious disadvantage, since it involved breaking two magnetic joints and resulted in a change of strength in the field generated by the permanent magnet. With our present knowledge and facilities it is a simple matter to construct the moving coil, together with its conducting-filaments, controlling-springs, pivot-points, and jewels so that they will remain constant and unchanged throughout a practically indefinite period of time. We have not, however, learned as yet to construct a permanent magnet which under all conditions will retain its initial magnetism, and the principal source of error in instruments of this class consists in the gradual loss of magnetism in the permanent magnet-field, which results in errors in the indications of the instrument. Since the maintained accuracy of this type of instrument is dependent on maintaining the constancy of the permanent magnet-field, it follows that any construction tending to preserve the initial constancy of the permanent magnet is of considerable advantage. I have found that one of the principal causes of decreased field strength is due to the breaking of the magnetic joint existing between the pole-faces of the permanent magnet and the pole-pieces attached thereto. It is a practical impossibility after having once broken such a magnetic joint to replace it so that the strength of the field is identical with that previously existing. To overcome this defect in construction, I have devised a combination of supporting-bracket, core, and moving coil so constructed and related to one another that they may be removed from the field of force without disturbing the pole-pieces of the permanent magnet.

The supporting-bracket consists, preferably, of a brass casting composed of an upright member 6 with two arms 7 and 8 at right angles. The vertical portion 6 carries a curved seat 9, to which is attached the core-piece 4 by means of the screw 10. This secures the core-piece firmly to the bracket. In the arms 7 and 8 are mounted threaded brass rods 11 and 12, carrying the jewels which support the moving coil 1. These same rods carry arms 13, to which the current-carrying wire is attached and by means of which current is conveyed to the springs 14. Attached to the vertical side of the bracket 6 is a lug 15, by means of which the bracket can be secured to the brass casting 16. The upper part of 6 is extended and provided with the slot 17, so as to allow the counterpoise 20 to swing in it freely. The counterpoise 20, pointer 5, and springs 14 are attached to two short axes, which in turn are secured to the moving coil 1. The sides of 6 are made so as to fit neatly between the edges of the pole-pieces 3 in order to act as a guide when inserting or removing the system.

From the above it will be noted that all the moving parts of the instrument are connected to the removable bracket, as shown, and can be inserted or withdrawn from the space between the pole-pieces 3 without necessitating the removal of the pole-pieces from the magnet.

The magnet 2 is secured to the pole-pieces 3 3 by means of the screws 25 and 26. This attachment is a permanent one and is not disturbed after the instrument has once been built. The whole magnetic system is secured to the base 16 by means of the screws 23 and 24, which engage the pole-pieces 3 3, and the base 16 is secured to the case or subbase 18 by screw 19.

I have devised and constructed a moving coil which is shown isometrically in Fig. 6 and diagrammatically in Fig. 7. This coil is constructed with two separate and distinct windings, one on top of the other, on the same general principle that is employed in constructing an alternating-current transformer. The outer winding (marked 21 in Fig. 7) carries the current to be measured and is connected to the source of electric power and constitutes the primary or active winding. The secondary or inner winding (marked 22) is short-circuited on itself and in consequence constitutes a short-circuited secondary, the iron core 4 supplying the requisite iron to make a magnetic circuit. From this construction it follows that whenever current is made or broken in the active winding or whenever current increases or decreases in the active winding a momentary current is induced in the secondary winding 22, which tends to move the coil in the opposite direction from that due to the current in 21. It therefore follows that every change of current which would tend to induce a change in position of the moving coil is opposed by a weaker current induced in the short-circuited winding, which has the effect of damping the oscillations of the coil and bring it to rest almost instantly. The induced current in the short-circuited coil ceases the instant the current becomes steady in the active coil, and therefore does not influence the indications of the instrument. In addition to this the short-circuited coil has induced in it a current due to its motion in the permanent magnet-field, which induced current is in the same direction as the current induced by the active winding, and therefore augments the damping effect. The winding of the active portion of the moving coil 21, and consequently the winding of the short-circuited coil 22, varies with the character of the measurement to be made by the instrument. For measuring voltage the coils consist of a large number of turns of very fine wire, the active winding being in series with a non-inductively-wound resistance. When the instrument is used as an ammeter, the two coils consist of a small number of turns of wire of low resistance, the terminals of the active winding being connected in shunt to the circuit, so that they actually measure the drop in volts of that portion of the circuit and in consequence can be calibrated to indicate the actual current flow, since current flow can be measured by the amount of drop produced by it in a given length of conductor of known resistance. I have found that when the actuating and short-circuited coils are properly designed with reference to one another and with reference to the strength of field the motion of the moving coil is perfectly aperiodic—that is, it will move instantly when properly constructed and calibrated to a position proportional to the amount of current flowing in the actuating-coil and remain there without oscillation until the actuating-current is changed.

What I claim is—

1. In an electrical measuring instrument, the combination of a base, a magnet system secured to said base, a moving system, a bracket supporting said moving system and secured to said base, whereby the moving system may be removed or replaced without changing a constant of the instrument.

2. In an electrical measuring instrument, a base, pole-pieces secured to said base, a magnet secured to said pole-pieces, a bracket secured to said base, and the moving system supported in said bracket, whereby the moving system may be removed without disturbing a joint of the magnetic circuit.

3. In an electrical measuring instrument, a magnet, pole-pieces permanently secured thereto, a moving system, and a bracket for supporting said moving system and itself supported independently of the magnet system.

4. In an electrical measuring instrument, a magnet, pole-pieces permanently secured thereto, a movable coil, and a bracket supporting said coil within the field of said magnet and mounted independently of the magnetic system.

5. In an electrical measuring instrument, a permanent magnet, pole-pieces secured thereto, a movable coil, an index actuated thereby, and a bracket supporting said coil and index and mounted independently of the magnetic system.

6. In an electrical measuring instrument, a magnet, pole-pieces permanently secured thereto, a bracket mounted independently of the magnetic system, a pivoted coil supported by said bracket within the field of said magnet, and a core mounted within said coil and secured to said bracket.

7. In an electrical measuring instrument, a support for the moving system comprising a vertical member, a seat on said member to receive a core, an arm at each end of said vertical member, and a horizontal lug on said vertical member to secure the same to a base.

8. In an electrical measuring instrument, an integral support for the moving system comprising a vertical member, a horizontal arm at each end of said vertical member, and a horizontal lug on said vertical member to secure the same to a base.

9. In an electrical measuring instrument, a support for the moving system comprising a vertical member, a horizontal slot through said vertical member to accommodate a counterpoise, a horizontal arm at each end of said vertical member, and a lug on said vertical member to secure the same to a base.

10. In an electrical measuring instrument, a magnet, pole-pieces secured thereto, a moving system, a bracket supporting said moving system and mounted independently of the magnetic system, and means for guiding the moving system relative to the magnetic system during the assemblage of the instrument.

11. In an electrical measuring instrument, a moving system comprising a removable bracket, extensions from said bracket supporting pivot-jewels, a movable coil having pivots bearing in said jewels, an indicating-needle secured to said coil, and means upon said bracket for securing the same to the base of the instrument.

12. In an electrical measuring instrument, a magnetic system, and a moving system comprising a removable bracket, extensions from said bracket, a moving coil having pivots bearing in said extensions, and means upon said bracket for securing the same independently of the magnetic system.

13. In an electrical measuring instrument, a removable moving system comprising a coil oscillating on pivots, a bracket having extensions carrying bearings for said pivots, and means upon said bracket for securing the same to the base of the instrument independently of the fixed magnetic system.

14. In an electrical measuring instrument, a base, pole-pieces secured to said base, a permanent magnet secured to said pole-pieces, and a removable moving system comprising a coil oscillating on pivots, bearings for said pivots, a bracket provided with extensions for said bearings, and means on said bracket for securing the same to said base.

15. In an electrical measuring instrument, the combination of a permanent magnet, pole-pieces secured thereto, a coil movable in the field of force of said magnet, and means for supporting said coil in a field of force of said magnet and independently thereof whereby said coil may be removed without disturbing a joint of the magnetic circuit.

16. In an electrical measuring instrument, a magnetic system, a moving system comprising a pivoted coil, a bracket supporting said movable coil and means for securing said bracket independently of the magnetic system.

17. In an electrical measuring instrument, a magnetic system, a moving system comprising a pivoted coil, a bracket supporting said coil, said magnetic system and moving system being secured in operative relation but independently of each other.

JOHN FRANKLIN STEVENS.

Witnesses:
GEO. W. W. CORNMAN, Jr.,
H. F. HANNIS.